Figure 1:
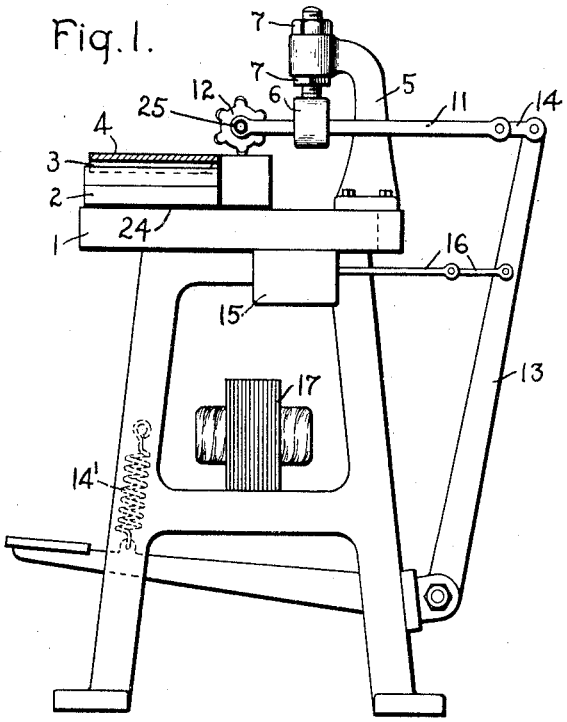

H. GEISENHÖNER.
WELDING MACHINE.
APPLICATION FILED MAR. 16, 1911.

1,036,605.

Patented Aug. 27, 1912.

Witnesses:
Earl G. Klock.
J. Ellis Glen.

Inventor:
Henry Geisenhöner,
by Albert G. Davis
His Attorney.

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

WELDING-MACHINE.

1,036,605. Specification of Letters Patent. Patented Aug. 27, 1912.

Application filed March 16, 1911. Serial No. 614,821.

*To all whom it may concern:*

Be it known that I, HENRY GEISENHÖNER, a citizen of the United States, residing at Schenectady, county of Schenectady, State of New York, have invented certain new and useful Improvements in Welding-Machines, of which the following is a specification.

My invention relates to electric welding machines.

It is desirable at times to weld two parts together at intervals only and the object of my invention is to provide an improved apparatus to do this sort of welding.

In the drawing, which forms a part of this specification, similar reference characters refer to the same part.

Figure 2:
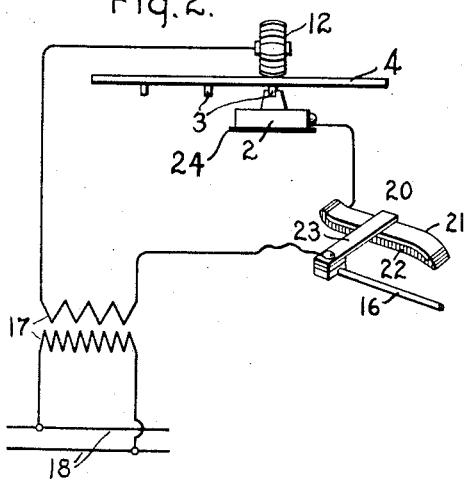
Figure 3:
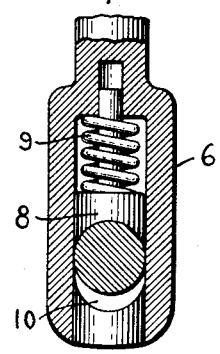

Figure 1 is an elevation of a device embodying my invention; Fig. 2 is a diagrammatic representation of the connections; and Fig. 3 is a sectional view of a detail of my device.

I have shown my invention as embodied in a machine to weld small blocks to a sheet, as, for example, space blocks to laminations for the cores of dynamo-electric machines, but of course it will be understood that this is not the only use to which this machine may be applied.

A table 1 supports a block 2 which holds the work. In this particular representation this block 2 holds a block 3 on which rests the plate or lamination 4 (shown in Fig. 1 in cross section) to which the block 3 is to be welded. An arm 5 is fastened to the table 1 and carries the member 6. This member 6 may be provided with screw threads which engage the nuts 7 in order that the member 6 may be raised or lowered as desired. The lower part of the member 6 is hollowed out to receive the plunger 8 which is pressed outward by the spring 9, located on the stem of the plunger. Transversely to the member 6 is an opening 10 to receive the link 11 upon which bears the plunger 8. At the inner end of the link 11 is pivoted the electrode 12. This electrode is made in the shape of a cylinder provided with one or more projections; preferably the electrode has the form of a gear wheel, the teeth being rounded as shown in the drawing in order that the wheel may be made quite thick and that only a part of each tooth will bear upon the work. The link 11 is adapted to be moved longitudinally through the member 6. Any means may be used to produce this movement and I have shown as one means the bell crank lever 13 connected to the link 11 by a second link 14 which is used to allow the link 11 to move horizontally. This lever 13 is normally held in the position shown by means of a spring 14'. To this lever 13 may also be connected, by means of the links 16, the switch which will be later described and which is contained in the case 15. The transformer, which it may be found desirable to use, may be located between the table legs, as at 17.

The connections are made as shown diagrammatically in Fig. 2. The current may be taken from the mains 18 and through the stepdown transformer 17, the secondary of which is connected to the electrode 12 and to the switch. Obviously the means for providing the proper current forms no part of my invention; the current may be taken from any desired source.

The switch 20, which is contained within the case 15, is so constructed that during the movement of the electrode in one direction the circuit is completed and upon the completion of this movement and during the return movement the circuit is broken to be recompleted on the beginning of the next operation. Any switch which will do this may be used, but I have shown, for illustration, a particular switch at 20. This switch consists of the contact 21 mounted on the insulating base of the curved shape shown at 22. A movable contact 23 is attached to the rod 16 and engages with the contact 21 and the insulating base 22. It will be apparent from the drawing that when the contact 23 is moved in one direction it will ride up the first inclined face of the insulating base and engage the contact 21 for its entire length; after it has left the contact 21, after completing the full stroke, it will return in contact with the opposite side of the insulating base 22 by reason of the peculiar shape of the base. The contact 21 is connected to the block 2 and the contact 23 is connected with one side of the source of current. The other side of the source of current is connected to the electrode 12. To prevent the energizing of the whole machine and the short circuiting of the source of current, the block 2 and electrode 12 will be insulated from the other parts and from each other in any desired manner as by the insulating plate 24 and the insulating bushings 25.

The operation of the device is as follows: The two pieces to be welded together are placed in the machine as indicated in the drawings. The nuts 7 are then adjusted to create the desired pressure between the electrode 12 and the work 3, 4. The spring 9, during the operations, will allow for any irregularities which may be encountered by the electrode on the surface of the work. From the position shown in Fig. 1, the lever is now moved downward. By this operation the contact 23 is moved to the left, as shown in Fig. 2, in engagement with the contact 21, and thereby the circuit is completed through the electrode 12, the work 4, 3 and the block 2. The electrode 12 and the block 2 may be made so large in proportion to the work 3, 4, that they will not become heated sufficiently to fasten to the work by the current which passes through them and which is required to weld the parts 3, 4 together. When the lever 13 is moved downward the link 11 with the electrode 12 will be moved to the left, as shown in Fig. 1, and as each tooth of the electrode 12 comes in contact with the work a current sufficiently great to weld the parts 3, 4 together at the particular point of application passes through. At the end of the stroke the lever is released, the spring 14' returns the lever to the position shown, and, as previously described, the circuit is broken during this part of the operation while the electrode is retracing its path. After one complete stroke the work may be shifted as desired.

It is obvious that my invention is not limited to the particular structure shown herein, and I aim in the appended claims to cover all modifications that do not involve a departure from the spirit and scope of my invention.

What I claim as new and desire to secure by Letters Patent of the United States, is,—

1. In a welding machine, an electrode provided with a plurality of welding points, and means for supporting said electrode and presenting the welding points to the work successively.

2. In a welding machine, an electrode in the form of a gear with blunt teeth, and means for supporting said electrode to allow its rotation.

3. In a welding machine, means to hold the work, an electrode in the form of a cylinder provided with a projection having a blunt welding end, and means to support the electrode, to move it and the work relatively and allow rotation of the electrode in proximity to the work.

4. In a welding machine, means to hold the work, an electrode in the form of a gear with blunt teeth, and means to support the electrode, to move it and the work relatively and allow rotation of the electrode in proximity to the work.

5. In a welding machine, means to hold the work, an electrode in the form of a gear with blunt teeth, and means to rotate the electrode on the work.

6. In a welding machine, means to hold the work, an electrode in the form of a gear with blunt teeth, and means to press the electrode on the work and rotate it relative thereto.

7. In a welding machine, an electrode in the form of a gear, a link carrying the electrode, means for applying pressure to said link, and means for moving said link.

8. In a welding machine, an electrode, means to move the electrode and the work relatively, and a switch to close the circuit while the electrode and work are moving relatively in one direction and to open it when they are moving relatively in another direction.

9. In a welding machine, an electrode in the form of a gear having different diameters, and means to move the electrode and the work relatively.

10. In a welding machine, an electrode in the form of a gear, the teeth thereof being spaced apart a distance sufficient to make disconnected welds, and means for passing said electrode over the work and to allow its rotation.

11. In a welding machine, means to hold the work, an electrode in the form of a gear, the teeth thereof being spaced apart a distance sufficient to make disconnected welds, and means to support the electrode, to move it and the work relatively and allow rotation of the electrode in proximity to the work.

12. In a welding machine, means to hold the work, an electrode in the form of a gear, the teeth thereof being spaced apart a distance sufficient to make disconnected welds, and means to rotate the electrode on the work.

13. In a welding machine, an electrode in the form of a gear, the teeth thereof having substantial welding areas proportional directly to the size of the welds to be made and being spaced apart a distance sufficient to make disconnected welds, and means for passing said electrode over the work and to allow its rotation.

14. In a welding machine, means to hold the work, an electrode in the form of a gear, the teeth thereof having substantial welding areas proportional directly to the size of the welds to be made and being spaced apart a distance sufficient to make disconnected welds, and means to support the electrode, to move it and the work relatively and allow rotation of the electrode in proximity to the work.

15. In a welding machine, means to hold the work, an electrode in the form of a gear, the teeth thereof having substantial welding areas proportional directly to the size of the welds to be made and being spaced apart a distance sufficient to make disconnected welds, and means to rotate the electrode on the work.

In witness whereof, I have hereunto set my hand this 15th day of March, 1911.

HENRY GEISENHÖNER.

Witnesses:
    BENJAMIN B. HULL,
    HELEN ORFORD.